(12) United States Patent
Adler et al.

(10) Patent No.: US 8,458,523 B2
(45) Date of Patent: Jun. 4, 2013

(54) META ATTRIBUTES IN FUNCTIONAL COVERAGE MODELS

(75) Inventors: Yoram Simha Adler, Haifa (IL); Noam Behar, Haifa (IL); Dale E. Blue, Haifa (IL); Orna X Orna Raz-Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/910,805

(22) Filed: Oct. 24, 2010

(65) Prior Publication Data

US 2012/0102366 A1    Apr. 26, 2012

(51) Int. Cl.
*G06F 11/00* (2006.01)

(52) U.S. Cl.
USPC ............................................................ 714/33

(58) Field of Classification Search
USPC ................... 714/25–27, 32, 33, 37, 38.1, 39, 714/45, 46
See application file for complete search history.

(56) References Cited

U.S. PATENT DOCUMENTS

| | | | |
|---|---|---|---|
| 7,389,215 B2 * | 6/2008 | Azatchi et al. | 703/14 |
| 7,428,715 B2 * | 9/2008 | Fournier et al. | 716/136 |
| 8,001,427 B2 * | 8/2011 | Sohm et al. | 714/45 |
| 2006/0129871 A1 * | 6/2006 | Smith | 714/2 |
| 2006/0229860 A1 * | 10/2006 | Azatchi et al. | 703/14 |
| 2012/0102365 A1 * | 4/2012 | Adler et al. | 714/45 |

* cited by examiner

*Primary Examiner* — Nadeem Iqbal (74) *Attorney, Agent, or Firm* — Ziv Glazberg; Glazberg & Applbaum Co.

(57) ABSTRACT

A meta attribute useful for functional coverage is computed based on values comprised by two or more matching fields in a trace. The two or more matching fields may be comprised by a single entry of the trace or by a plurality of entries of the trace. A definition of the meta attribute may define which fields of the entries comprise values useful for computation of the meta attributes. The matching entries may be identified based on identifying values within the entries.

23 Claims, 5 Drawing Sheets

META ATTRIBUTES IN FUNCTIONAL COVERAGE MODELS

BACKGROUND

The present disclosure relates to testing coverage in general, and to functional coverage, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase, a sample of all possible behaviors of the computerized device is inspected. Coverage tools for checking software provide a measure of how well the software being evaluated has been exercised during testing and thereby give a level of assurance that the software is of high quality. A coverage model defines elements of the target system, and enables determination of whether a coverage task, associated with an element of the target system, has been executed, operated or the like.

There are a number of types of coverage models known in the art, such as statement coverage, line coverage, condition coverage, path coverage, method coverage, and the like. One additional coverage model is functional coverage. Functional coverage defines functional elements of the target system. A functional element defines a functional state, behavior or the like of the target system. Functional coverage may be used to measure amount, portion or a similar metric of tests that examined predetermined functional behaviors. Once functional coverage is measured, quality assurance (QA) personnel may design additional tests to examine untested functional elements.

Traditionally, the functional coverage model is defined by a QA staff member, an engineer, a programmer or the like. The functional coverage model comprises a set of attributes, each having a corresponding set of possible values. The functional coverage may define a set of coverage tasks, each comprising a combination of values of the different attributes. In some cases, each pair, triplet, quadruplet and the like of values of two attributes defines a functional element, also referred to as a coverage task. As opposed to other coverage methods, the functional coverage model may be used for determining whether a predetermined behavior was covered. A coverage task of a functional coverage model may describe the expected behavior of the system. For example, a functional coverage model may list important recovery states that should be tested. A coverage task of a code-based coverage model, on the other hand, indicates whether the code element listed in the task (e.g., a line in a source file) has been visited.

Functional coverage checks coverage of coverage tasks in a trace. The trace comprises a plurality of entries, each entry indicative of a coverage task that was covered by a target device, system, program or the like (referred to hereinbelow as a target system). For example, each entry may describe a state of a transaction performed by the target system. As another example, an entry may describe a state of one or more concurrent entities of the target system (such as software services, software threads, hardware threads, cores of a CPU, processors, or the like). The trace may be generated during execution of the target system. The entry may comprise values of functional coverage attributes. In some cases, some entries may not indicate a value of each attribute, but rather a portion thereof.

The functional coverage model may further comprise a set of restrictions defining a series of values of different attributes that may not appear together. For example, consider a functional coverage defining two attributes: ACTION and USER. The ACTION attribute may be each of the following values: RETRIEVE, STORE, and MODIFY PERMISSION. The USER attribute may be each of the following values: ADMIN, USER, GUEST. In some cases, a guest user cannot modify permission. A restriction may be defined to indicate that the couple (GUEST, MODIFY PERMISSION) is not a valid couple. The fact that a trace does not comprise an entry covering a coverage task that includes the couple does not affect the functional coverage. In other words, all possible coverage tasks—which together form the maximal possible coverage in respect to a functional coverage—do not include any coverage task that comprises the restricted couple.

Functional coverage may be measured in respect to a "white box" target system or to a "black box" target system. For example, the implementation of the target system may not be available during execution, and thus be referred to as "black box". Using the input and output of the target system, such as input signals and logged events, a functional state of the target system may be evaluated.

SUMMARY

One exemplary embodiment of the disclosed subject matter is a computer-implemented method comprising: obtaining at least a definition of a meta attribute, the meta attribute is associated with a functional coverage model, the functional coverage model comprises attributes and corresponding values; obtaining a trace associated with a target system, the trace comprises a plurality of entries, wherein substantially each entry of the plurality of entries is indicative of a state of the target system; identifying two or more matching fields from one or more entries of the plurality of entries; computing, by a processor, a value of the meta attribute based upon values of the two or more matching fields and based upon the definition of the meta attribute; and outputting an indication of a covered coverage task, the covered coverage task comprises the value of the meta attribute associated with the meta attribute.

Another exemplary embodiment of the disclosed subject matter is a computerized apparatus, the computerized apparatus having a processor and a storage device; the computerized apparatus comprising: a meta attribute obtainer operative to obtain a definition of a meta attribute, the meta attribute is associated with a functional coverage model, the functional coverage model comprises attributes and corresponding values; a trace obtainer operative to obtain a trace associated with a target system, the trace comprises a plurality of entries, wherein substantially each entry of the plurality of entries is indicative of a state of the target system; a matching fields identifier operative to identify two or more matching fields from the plurality of entries; and meta attribute value calculator operative to compute a value of the meta attribute based upon values of the two or more matching fields.

Yet another exemplary embodiment of the disclosed subject matter is a computer program product, the product comprising: a non-transitory computer readable medium; a first program instruction for obtaining at least a definition of a meta attribute, the meta attribute is associated with a functional coverage model, the functional coverage model comprises attributes and corresponding values; a second program instruction for obtaining a trace associated with a target system, the trace comprises a plurality of entries, wherein substantially each entry of the plurality of entries is indicative of a state of the target system; a third program instruction for identifying two or more matching fields from one or more entries of the plurality of entries; a fourth program instruction for computing a value of the meta attribute based upon values of the two or more matching fields and based upon the definition of the meta attribute; a fifth program instruction for outputting an indication of a covered coverage task, the covered coverage task comprises the value of the meta attribute associated with the meta attribute; and wherein the first, second, third, fourth, and fifth program instructions are stored on the non-transitory computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to refer in a functional coverage model to a meta attribute. The meta attribute is a functional attribute whose value is not explicitly stated in any entry of the trace. The value of the meta attribute is inherently defined based upon values explicitly appearing in one or more entries of the trace. Another technical problem is to automatically extract values of meta attributes from the trace and utilize those values for determining functional coverage measurement. Yet another technical problem is to automatically identify two or more matching fields, whose values inherently define the value of the meta attribute. In response to identification of the two or more matching fields, the value of the meta attribute may be calculated. In some exemplary embodiments, the two or more matching fields may be comprised by a single entry (e.g., two different fields of the same entry) or by a plurality of matching entries (e.g., the same field in two or more different entries or different fields in two or more different entries).

One technical solution is obtain a definition of a meta attribute. The definition of the meta attribute may identify a field in an entry that is used in computation of a value of a meta attribute. Another technical solution is to identify in a trace two or more matching fields and utilize their value in calculating the value of the meta attribute. Yet another technical solution is to identify in the trace the matching fields in two or more matching entries based upon predetermined values in predetermined fields. The predetermined values in the predetermined fields may be defined in the definition of the meta attribute. In response to the identification of the two or more matching entries, the values of the matching entries in the field defined in the definition of the meta attribute may be utilized in calculating the value of the meta attribute. Yet another technical solution is to identify a first entry in the trace and iterate over the trace (either to successive entries or to preceding entries) until a second entry that matches the first entry is located. In some exemplary embodiments, during the iteration of the entries additional matching entries may be accumulated to be utilized in computing the meta attribute. In some exemplary embodiments, values comprised by the first and second entries may be utilized in computing the meta attributes. Yet another technical solution is to bin the value of the meta attribute as to provide for discrete values of a relatively limited number of alternative values.

One technical effect of utilizing the disclosed subject matter is to provide for a functional coverage model that determines coverage in respect also to functional attributes that are not explicitly found in the trace. In some exemplary embodiments, the target system may be utilized as is. Modification of the target system or corresponding logging system may not be required in order to explicitly calculate values of the meta attribute and provide those values in the trace. Another technical effect is to enable a verification engineer or a similar user to utilize inherent properties of the target system for functional coverage measurement. Yet another technical effect is to increase the number of possible functional attributes associated with a target system that can be used in functional coverage determination without requiring any modification to the target system.

Figure 1:
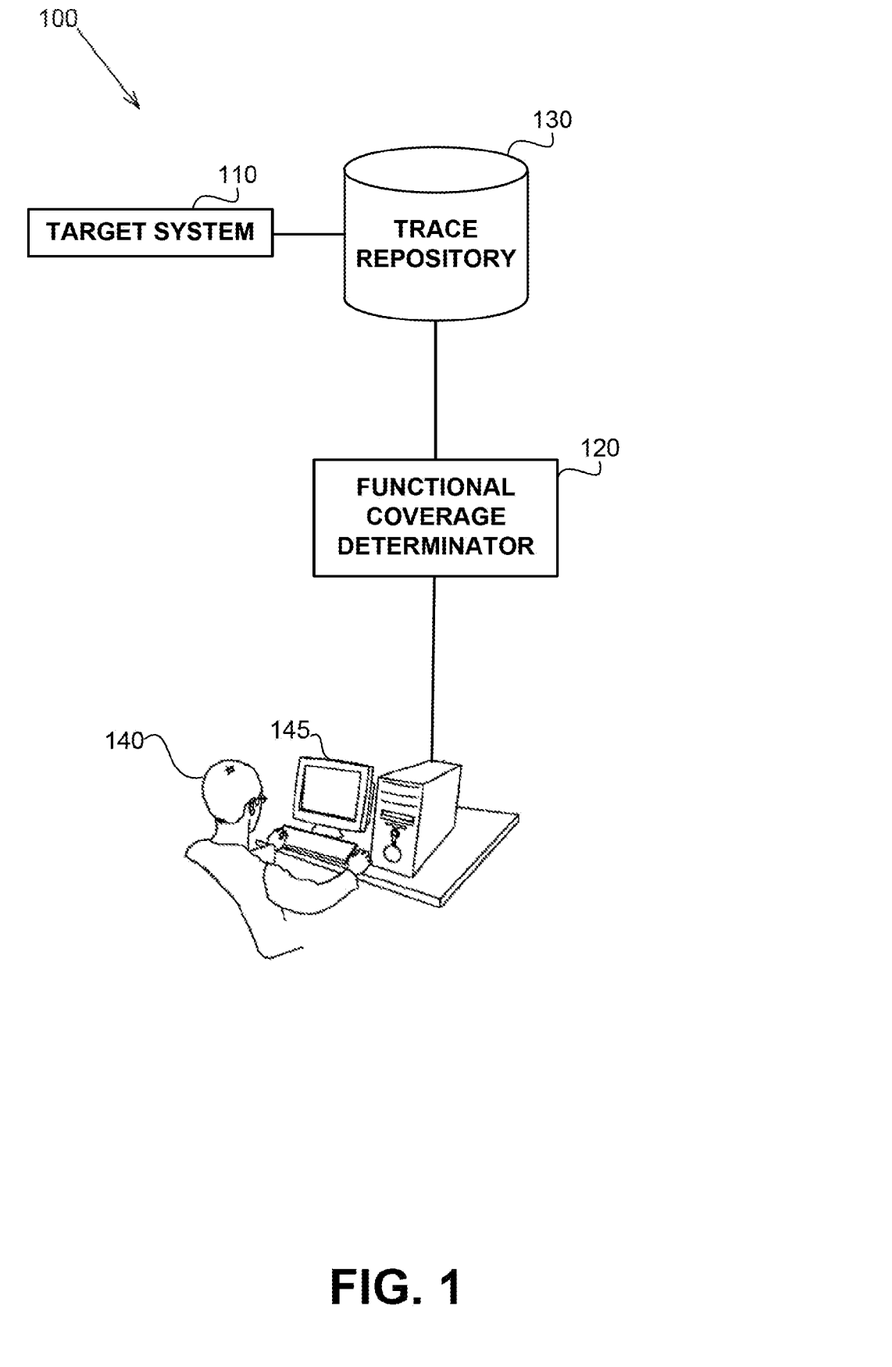
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

A computerized environment 100 may comprise a target system 110. Traces associated with the target system may be stored in a trace repository 130. In some exemplary embodiments, the traces may be generated and stored by the target system 110, by an auditing device, such as a logging system (not shown), or the like. In some exemplary embodiments, the traces may comprise entries representative of a state of the target system 110 in a given time. In some exemplary embodiments, the trace may be for example a log file. In some exemplary embodiments, the log file may be generated periodically, in predetermined times, on a regular basis or the like. In some exemplary embodiments, the log file may be generated in response to a predetermined operation of the target system 110, such as for example in case a condition is held, in response to an abnormal behavior, in response to a request by a user or the like.

In some exemplary embodiments, the trace repository 130 may be a storage system, a hard disk drive, a Flash disk, a Random Access Memory (RAM), a memory chip, a remote storage server, or the like capable of retaining one or more traces of the target system 110.

In some exemplary embodiments, a functional coverage model determinator 120 may be configured to obtain at least one trace and a functional coverage model and determine functional coverage measurement of the trace in respect to the functional coverage model. The functional coverage measurement may be useful in determining whether sufficient testing of the target system 110 was performed and whether possible functional operation of the target system 110 was not tested. In some exemplary embodiments, the functional coverage model determinator 120 may retrieve the trace from the trace repository 120. In some exemplary embodiments, the functional coverage model determinator 120 may be configured to obtain the functional coverage model from a user 140 via a Man-Machine Interface (MMI) 145. In some exemplary embodiments, the functional coverage determinator 120 may display the results of the comparison to the user 140 using the MMI 145.

In some exemplary embodiments, the user 140 may be a developer, a tester, a QA staff member, a coverage specialist or the like. The user 140 may interact with the computerized system 100 using the MMI 145 such as a terminal, a display, a keyboard, an input device or the like. In some exemplary embodiments, the user 140 may be capable of initiating operation of the target system 110, such as for example executing the target system 110.

Functional coverage models are known in the art. For example, refer to Grinwald et al. "User Defined Coverage—A Tool Supported Methodology for Design Verification" DAC 1998: 158-163 which is hereby incorporated by reference. In some exemplary embodiments, the functional coverage model may be configurable by a user, such as 140, to focus on specific functional elements in lieu of code elements, as is normally the case with various code coverage models. The functional coverage model may be associated with the target system 110. The functional coverage model may comprise functional attributes defining a functional state of the target system. Functional attributes may, for example, define an Application Programming Interface (API) being utilized, a method of the API operating, a state within the operation, utilization of peripheral devices, operation of modules of the target system, an instance of an Operating System (OS) being used, an instance of an application being used (e.g., a Google® Chrome or a Microsoft® Internet Explorer as a web browser), and the like. For each functional attribute there may be a set of possible values. In some exemplary embodiments, the functional coverage model may define restrictions over combinations of values of different functional attributes. For example, the Internet Explorer web browser may not be operated using the Linux OS. A restriction of this couple may be defined to indicate the above. In some cases, the restricted combination of values may include two or more values of attributes.

An attribute of the functional coverage model may be a meta attribute, in accordance with the disclosed subject matter. The functional coverage model determinator 120 may determine a meta attribute associated with a coverage task covered by the trace of the target system 110. The value of the meta attribute may not explicitly appear in the trace. The value of the meta attribute may be calculated based upon two or more values appearing in the trace, such as subtracting a first value of a first entry from a second value of a second field, or such as subtracting a first value of a first field of an entry from a second value of a second field of the entry. For example, a meta attribute may be a duration of time of an operation of a service, transaction, method or the like. The duration of time may be calculable by subtracting from a timestamp of an entry associated with the end of the operation a timestamp of an entry associated with a beginning of the operation. As another example, a meta attribute may be a number of concurrent entities operating simultaneously. A concurrent entity may be, for example, a thread, a service, a transaction or the like. The value of the meta attribute may be calculated by iterating over all the entries in between a first entry indicative of beginning of operation of a first concurrent entity and a second entry indicative of ending of operation of a second concurrent, and adding a binary value of 1 for each concurrent entity which an iterated entity indicates that is operating. As yet another example, the meta attribute may be a number of concurrent entities operating within a predetermined timeframe. The value of the meta attribute may be calculated by adding a binary value of 1 for each concurrent entity that is indicated to operate based on entities in between a first and second entries associated with the bounds of the predetermined timeframe. As yet another example, the meta attribute may be a Boolean value of either TRUE or FALSE associated with a bit flip of a predetermined bit within a storage unit target value of a storage unit (e.g., a value of a register, a value in a memory address, or the like). The value of the meta attribute may be calculated based on two consecutive entries in which the target value is displayed. Consecutive entries, for the purpose of this example, are two entries that follow each other, and any entry in between, should there be any, does not display the target value. The value may be calculated by determining whether the value of predetermined bit is flipped between the two consecutive entries.

Figure 4:
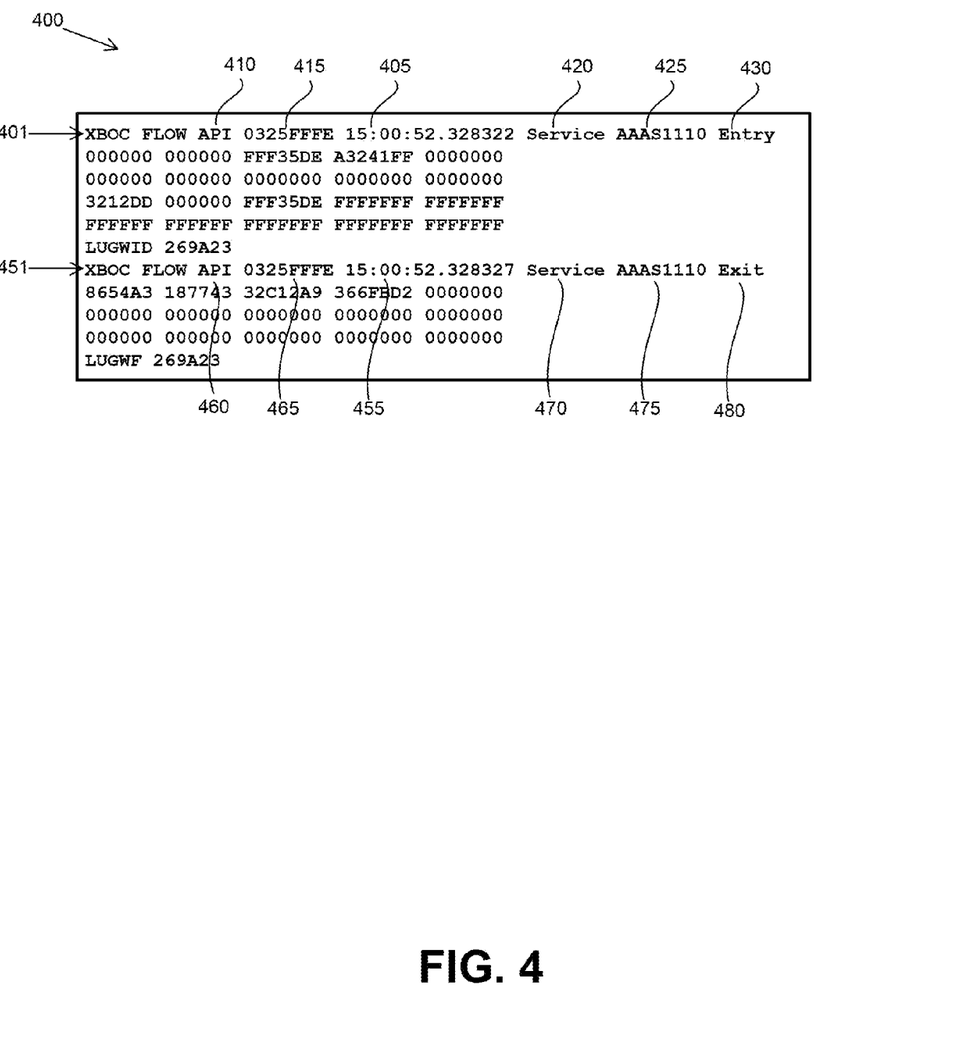
FIG. 4 shows an exemplary trace snippet, in accordance with some exemplary embodiments of the disclosed subject matter.

Through the present disclosure, an exemplary trace of FIG. 4 is used for clarity of explanation. The disclosed subject matter is not limited to this example in any manner. Specifically, the disclosed subject matter is not limited to the format of the entries in this example.

Referring now to FIG. 4 showing an trace snippet, in accordance with some exemplary embodiments of the disclosed subject matter. A trace snippet 400 shows a portion of the trace comprising two entries: a first entry 401 and a second entry 451. The entries comprise fields. For example, the first entry 401 comprises a first field containing XBOC, a second field containing FLOW, a third field containing API, a fourth field containing 0325FFFE, and so forth.

In some exemplary embodiments, an entry identifier may be utilized to differentiate between two entries. For example, a timestamp in a field 405 may indicate the beginning of the first entry 401, while a timestamp in a field 455 may indicate the beginning of the second entry 451.

The first entry 401 comprises an API field 410 indicating that the following field—an API value field 415 comprises an identifier of the API operating. A service field 420 indicates that the following field—a service value field 425 comprises an identifier of the service operating within the API. Operation of the service may be indicated in an operation field 430. In a similar manner, the same format may be applicable to the fields 460 (API field), 465 (API value field), 470 (Service field), 475 (Service value field) and 480 (operation field).

In one exemplary embodiment, a functional coverage model may comprise three attributes: an API attribute, corresponding to a name of module operating in the system, as indicated in fields such as 415 and 465; a service attribute, corresponding to a name of service operating with the module, as indicated in fields such as 425 and 475; and length of service operation attribute. The length of service operation, or duration of service operation, may be short, medium or long. The length of service is not stated explicitly in the trace 400. The length of service operation attribute may be computed based on values of the trace 400. For example, the length of service may be computed by subtracting from the timestamp in 455 the timestamp in 405. The value of the attribute may be determined based on predetermined ranges (e.g., below a first predetermined time—short; above a second predetermined time—long; and between the first and second predetermined times—medium). The first entry 401 may be identified as an entry in which the beginning of the service is indicated based on the value "Entry" in field 430. The second entry 451 may be identified as an entry in which the end of the service is indicated based on the value "Exit" in the field 480. In some exemplary embodiments, there may be additional entries between the first entry 401 and the second entry 451 that do not indicate the end of the same service. For example, there may be entries indicating beginning and ending of other service, operation of the service(s), operation of other concurrent entities, and the like. The first entry 401 and the second entry 451 may be referred to as "matching entries" as they both "match" each other in referring to the same "thing" (in this example—same service in the API), and as both are required for computing the value of the value of the meta attribute.

Figure 2:
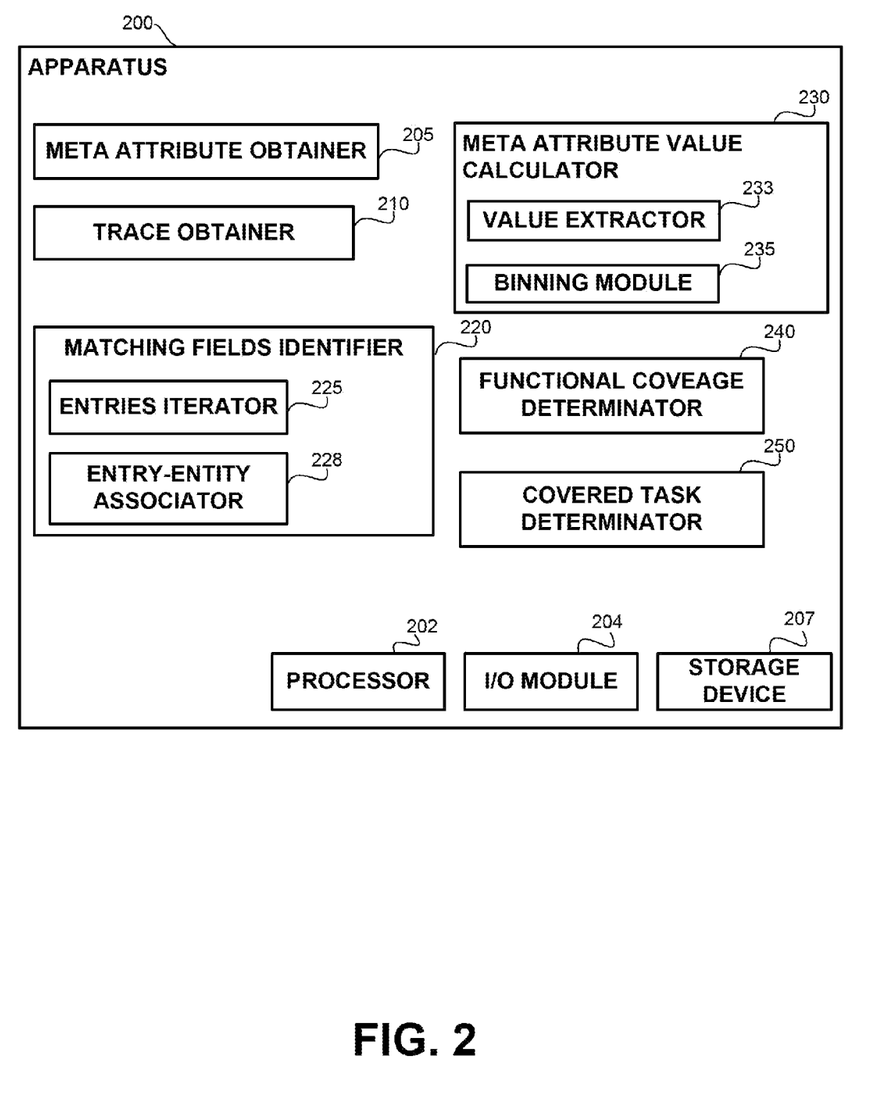
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as the functional coverage determinator 120 of FIG. 1, may be configured to determine a functional coverage measurement based on at least one trace.

In some exemplary embodiments, a meta attribute obtainer 205 may be configured to retrieve, receive or otherwise obtain a definition of a meta attribute. The definition may be obtained from a user, such as 140 of FIG. 1. In some exemplary embodiment, the user may indicate a field within an entry that is used as a basis for computing the value of the meta attribute. The user may further provide a formula, such as given by applying mathematical operation or other predetermined functions, of how the values of the matching fields in one or more entities are utilized to compute the value of the meta attribute. The meta attribute obtainer 205 may utilize an I/O module 204 to obtain the definition. In some exemplary embodiments, the definition may be predetermined and obtained from a configuration file or may be hardcoded, as is known in the art.

In some exemplary embodiments, a trace obtainer 210 may be configured to retrieve, receive, or otherwise obtain at least one input trace. The input trace, also referred to as a trace, may be obtained, for example, from a trace repository such as 130 of FIG. 1. The trace may comprise a plurality of entries, each indicative of functional operation of the target system. In some exemplary embodiments, the entries may be arranged in a hierarchy. In some exemplary embodiments, the entries may be heterogeneous. In some exemplary embodiments, each entry may comprise an entry identifier such as for example, as timestamp, an entry identification number, a processing entity, a combination thereof or the like. For example, in one exemplary embodiment, each entry may comprise three fields in the first line of the entry, the first containing a timestamp and the second containing a processing entity, and the third—an operation code. Other entry identifiers may be determined by a person of ordinary skill in the art. The entry identifier may be utilized to parse the trace into entries by a parsing module (not shown). In some exemplary embodiments, the trace obtainer 210 may utilize the I/O module 204 to obtain the input trace.

In some exemplary embodiments, a matching fields identifier 220 may be configured to identify two or more matching fields from the trace. In some exemplary embodiments, the matching fields may be comprised by a single entry or by two or more matching entries. In some exemplary embodiments, matching entries are entries that match each other in the sense that together they implicitly comprise information useful for calculating a value of a meta attribute. Referring again to FIG. 4, the matching fields identifier 220 may be configured to identify that first entry 401 and the second entry 451 as matching entries useful in computing the length of service operation meta attribute. In computing a meta attribute of a length of service, fields 405 and 455 may be considered as the matching fields.

In some exemplary embodiments, the matching fields may be defined by the meta attribute definition. In some exemplary embodiments, a predetermined field in different matching entries may be considered as a matching field. In some exemplary embodiments, a first predetermined field in one or more matching entries in a first portion of the trace may be considered as a matching field, while a second predetermined field in one or more matching entries in a second portion of the trace may be also considered as a matching field. In some exemplary embodiments, several predetermined fields of a single entry may be considered matching fields, as per the meta attribute definition. The above are examples only. A person of ordinary skill in the art would recognize various alternative matching fields.

In some exemplary embodiments, in response to identifying the first entry 401, the matching fields identifier 220 may iterate over following entries in the trace, until a matching entry, such as the second entry 451, is located. The matching entry may be located by observing predetermined field of the iterated entries, such as for example based on the definition of the meta attribute obtained by the meta attribute obtainer 205. For example, fields corresponding to field 430 may be observed until the value "Exit" is located. In some exemplary embodiments, fields corresponding to fields 415 and 425 are also observed to verify that the entity to which the entry refers to is the same entity which the first entry 401 refers to—in this case Service AAAS1110 of API 0325FFFE.

In some exemplary embodiments, the matching fields identifier 220 may comprise an entries iterator 225. The entries iterator 225 may be operative to iterate over the plurality of entries of the trace. The entries iterator 225 may be configured to begin iteration from a first matching entry until a second matching entry is identified. In some exemplary embodiments, the entries iterator 225 may iterate over the entries until a predetermined number of matching entries are located. In some exemplary embodiments, the entries iterator 225 may iterate over the entries until a predetermined entry is identified (e.g., an entry having the value "Exit"). Additional entries may be determined to be matching entries in between the first and second matching entries.

In some exemplary embodiments, the matching fields identifier 220 may comprise an entry-entity associator 228. The entry-entity associator 228 may be configured to associate an entry with an entity of the target system. For example, the first entry 401 of FIG. 4 may be associated with the API 0325FFFE, with the service AAAS1110 within that API or the like. In some exemplary embodiments, the entry-entity associator 228 may support variable granularity, such as in a first instance, an entity may be an API, and in the second instance the entity may be a service within an API. The entry-entity associator 228 may determine the entity associated with an entry based on values of fields of the entry. In some exemplary embodiments, the fields representing the entity to which the entry is associated comprise an identifying value in one or more fields of the entity. The identifying value is uniquely associated with an entity of the target system. The entry-entity associator 228 may determine which one or more fields comprise the identifying value based on configuration files, input from a user, or other input. In some exemplary embodiments, the fields comprising the identifying value are included in the definition of the meta attribute. It will be noted that in regards to the entry-entity associator 228, an entity may be any portion of the target system that are the object of the matching entries. As an example the entity may be a concurrent entity, a portion of software code, a modular service, or the like. A person of ordinary skill in the art is capable of determining additional such entities to be used in respect to other meta attributes, in accordance with the disclosed subject matter.

In some exemplary embodiments, a meta attribute value calculator 230 may be configured to calculate a value of the meta attribute based on values of the two or more matching fields identified by the matching fields identifier 220. In some exemplary embodiments, the value of the meta attribute is computed based on content of the two or more matching fields. In some exemplary embodiments, the meta value calculator 230 may be operative to calculate the value based on the definition of the meta attribute. The meta attribute value calculator 230 may, for example, add, subtract, multiply, divide, or perform similar operations on values comprised by the matching fields. The meta attribute value calculator 230 may determine Boolean or binary values based on predetermined values of the matching fields.

In some exemplary embodiments, a value extractor 233 may be operative to extract values from the matching fields. In some exemplary embodiments, the extracted value may be used to directly calculate the meta attribute. For example, values of a timestamp may be extracted from a first entry and from a second entry, and a duration may be calculated by subtracting a first time from a second time. In some exemplary embodiments, the extracted value may be used to indirectly calculate the meta attribute. For example, a register value may be extracted from two entries, and based upon the extracted values, the meta attribute value calculator 230 may determine whether a predetermined bit was flipped or not. As another example, based upon the value extracted from a meta attribute, a binary value may be determined as to indicate whether a concurrent entity is operating or not. The binary value may be added together with additional binary values to calculate the number of concurrent entity operating substantially simultaneously.

In some exemplary embodiments, a binning module 235 may determine a binned value for the meta attribute to be used instead of a value computed by the meta attribute value calculator 230. The binning value may unify a plurality of values into a single binned value. A binned value is a value that comprises a range or a set of other values. A binned value may be used to transform continuous values, such as for example Positive Real numbers, into a discrete set of values. For example, the three ranges [0 . . . 10], [11 . . . 100], and [100 . . . ∞] may be binned into three binned values. Generally, functional coverage models comprise only discrete values. Therefore, the value of the meta attribute may be computed and binned into a discrete value. A binned value may be used to unify together a number of separate values (either countable or not) into a single binned value. For example, the values 0-59 seconds may be binned into a single value "short". The binned value may be indicative of the values it comprises.

In some exemplary embodiments, a functional coverage determinator 240 may be configured to determine a functional coverage measurement of the target system. The functional coverage determinator 240 may determine the functional coverage measurement based upon values of entries of the trace and based upon meta attribute values computed by the meta attribute value calculator 230. The functional coverage measurement may be indicative of a number of coverage tasks of the functional coverage that are covered by the trace, a number of coverage tasks not covered by the trace, a portion thereof out of the total number of coverage tasks, or the like. In some exemplary embodiments, the functional coverage measurement may be useful in determining whether or not the target system was tested sufficiently. In some exemplary embodiments, the functional coverage measurement may be determined based on one or more traces, such as for example traces accumulated during the testing phase of the target system.

In some exemplary embodiments, a covered task determinator 250 may be operative to determine a coverage task that is covered by the trace. The covered task determinator 250 may determine to coverage task based on a value of a meta attribute computed by the meta attribute value calculator 230. The covered coverage task may be further determined based on one or more values explicitly comprised by an entry. For example, a coverage task may be a triplet: API, Service and Length of time. Based on the first and second entries 401 and 451 of FIG. 4, a covered coverage task may be determined. The covered coverage task is the triplet: (0325FFFE, AAAS1110, short). In this example, the API value may be extracted from either fields 415 or 465; the Service value may be extracted from either fields 425 or 475, and the Length of time is computed by the meta attribute value calculator 230 by subtracting the timestamp of field 405 from the timestamp of value 455 and binning the computed value (0.000005) into the binned value "short".

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 204. The I/O module 204 may be utilized to provide an output to and receive input from a user, such as 140 of FIG. 1.

In some exemplary embodiments, the apparatus 200 may comprise a storage device 207. The storage device 207 may be a hard disk drive, a Flash disk, a Random Access Memory (RAM), a memory chip, or the like. In some exemplary embodiments, the storage device 207 may retain program code operative to cause the processor 202 to perform acts associated with any of the subcomponents of the apparatus 200. The storage device 207 may retain a trace retrieved from a trace repository such as 130 of FIG. 1, and/or the definition of the meta attribute obtained by the meta attribute obtainer 205. The storage device 207 may retain the calculated value of the meta attribute computed by the meta attribute value calculator 230

Figure 3:
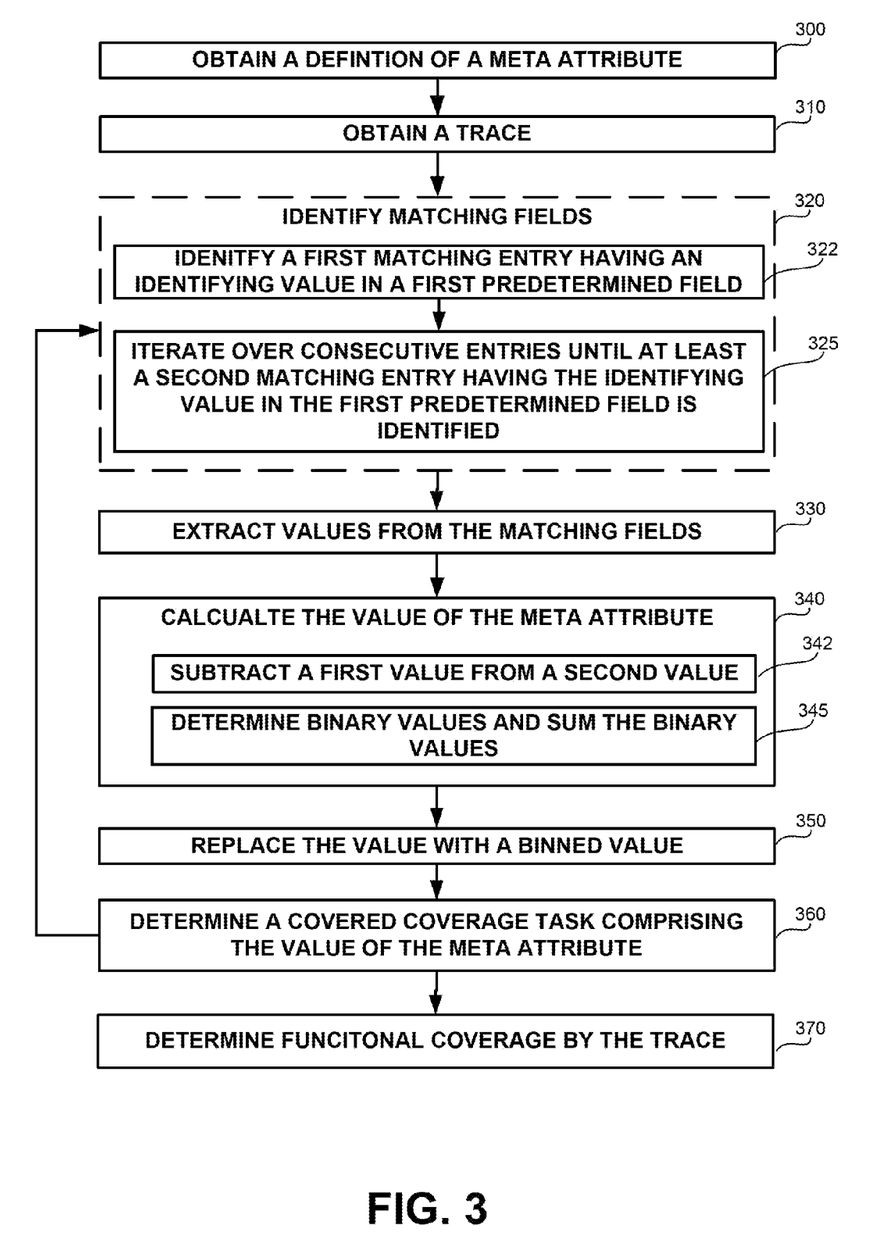
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a definition of a meta attribute may be obtained. The definition may be obtained by a meta attribute obtainer, such as 205 of FIG. 2. In some exemplary embodiments, the user, such as 140 of FIG. 1, may provide the definition by utilizing a graphical user interface. In some exemplary embodiments, the user may chose a field of an entry and provide an indication as to how that field is used to compute the value of the meta attribute. As an example, the field may be used directly in a mathematical computation. As another example, the field may be used to detect whether the entry is a matching entry in accordance with the disclosed subject matter. For example, the user may define predetermined values for the field for which the entry may be a matching entry.

In step 310, a trace may be obtained. The trace may be obtained from a trace repository such as for example 120 of FIG. 1. The trace may be obtained by a trace obtainer, such as 210 of FIG. 2.

In step 320, matching fields may be identified. The matching fields may be identified by a matching fields identifier, such as 220 of FIG. 2.

In some exemplary embodiments, the matching fields are comprised by matching entries. In some exemplary embodiments, step 320 may comprise steps 322 and 325.

In step 322, a first matching entry may be identified. The first matching entry may comprise at least one matching field. The first matching entry may be identified, for example, based on a predetermined value in a first predetermined field (e.g., "Entry" in field 430, as exemplified in FIG. 4). The first matching entry may comprise an identifying value in a predetermined field.

In step 325, the consecutive entries may be iterated over until at least a second matching entry is identified. The second matching entry may comprise at least one matching field. In some exemplary embodiments, a plurality of additional matching entries may also be identified. The second matching entry is identified as being associated with the same entity as the first matching entry, based on the identifying value.

Steps 322 and/or 325 may be performed by a matching fields identifier, such as 220 of FIG. 2, by an entries iterator, such as 225 of FIG. 2, by an entry-entity associator, such as 228 of FIG. 2, or the like.

In step 330, values may be extracted from the matching entries. The values may be extracted by a value extractor, such as 233 of FIG. 2.

In step 340, the value of the meta attribute may be calculated. The value may be calculated by a meta attribute value calculator, such as 230 of FIG. 2.

In some exemplary embodiments, step 340 may comprise step 342. In step 342, a first value may be subtracted from a second value. In some exemplary embodiments, the subtraction may be useful to determine a period of time between two timestamps.

In some exemplary embodiments, step 340 may comprise step 345. In step 345, binary values may be determined and summed together. The summed value may be indicative of the number of binary values that were determined to be "1". As an example, each binary value may be indicative to whether a different concurrent entity is operating at a timeframe. The summed value may be indicative of how many concurrent entities operate at the timeframe. In some exemplary embodiments, the timeframe may be determined as to encapsulate operations performed substantially simultaneously. It will be noted that other characteristic or properties of the target system may be evaluated instead of or in addition to operation of a concurrent entity.

In step 350, the value computed in step 340 may be replaced by a binned value. The binned value may be determined and utilized by a binning module, such as 235 of FIG. 2.

In step 360, a covered coverage task may be determined based on the meta attribute value (e.g., binned value or non-binned value). The covered coverage task may be determined by a covered task determinator, such as 250 of FIG. 2.

In some exemplary embodiments, a plurality of covered coverage tasks may be determined, each associated with different entries of the trace. In case an additional coverage task may be determined, steps 320-360 may be performed again. In case the trace was iterated over completely or in case there is no additional coverage task to be determined as covered based on the trace, step 370 may be performed.

In step 370, a functional coverage measurement may be determined as to the coverage achieved by the one or more traces obtained in step 310 in respect to the functional coverage model. The functional coverage measurement may be determined by a functional coverage determinator, such as 240 of FIG. 2. In some exemplary embodiments, the measurement may be outputted or otherwise provided to a user, such as 140 of FIG. 1.

Figure 3B:
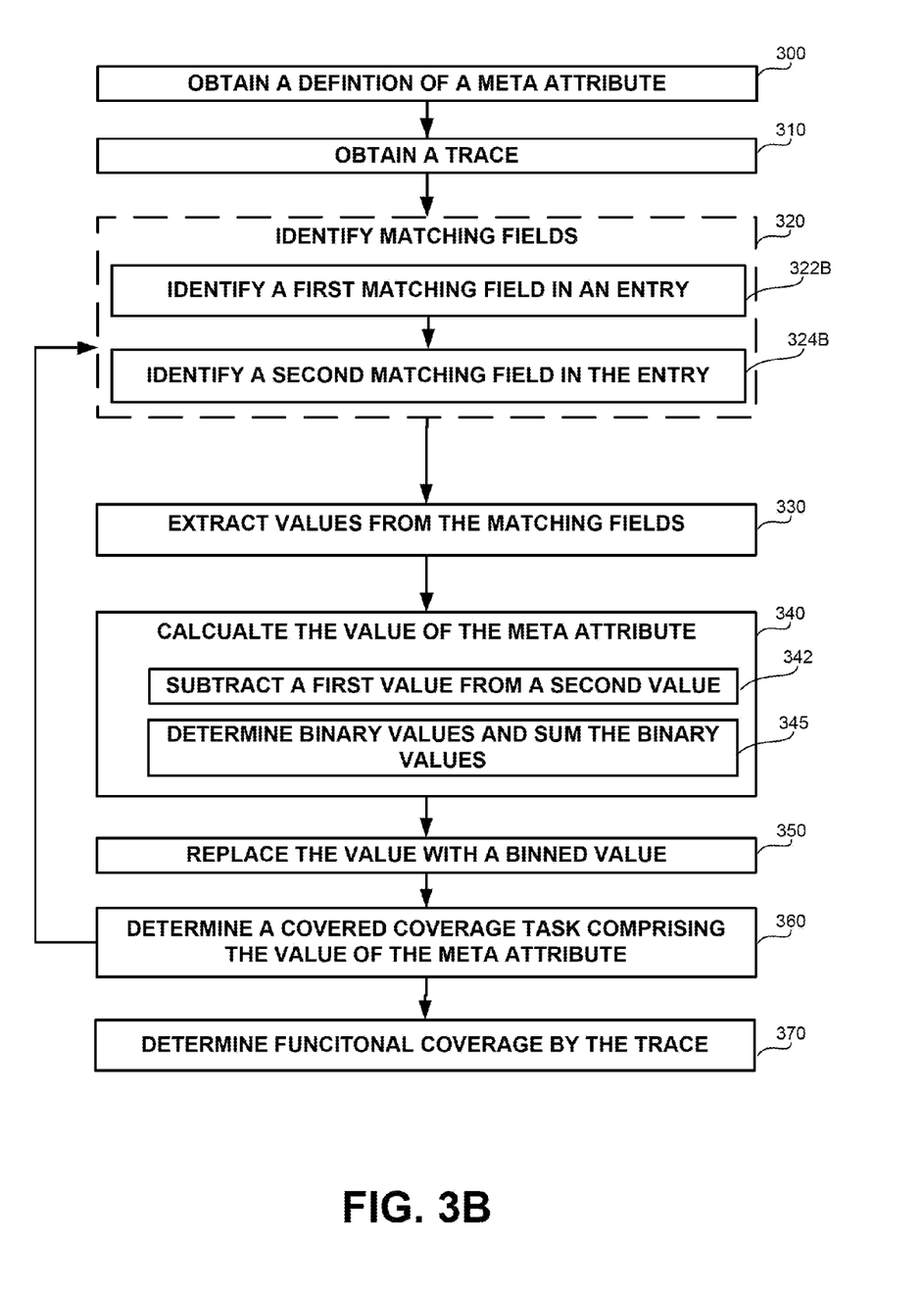
FIG. 3B shows a flowchart diagram of a method, in accordance with some exemplary embodiments of the disclosed subject matter.

Referring now to FIG. 3B showing a flowchart diagram of a method in accordance with some exemplary embodiments of the disclosed subject matter, similar to that shown in FIG. 3.

Step 320 of identification of matching fields may comprise steps 322B and 324B.

In step 322B, a first matching field may be identified in an entry of the trace. The first matching field may be identified based on the meta attribute definition.

In step 324B, a second matching field may be identified in the entry. The second matching field may be identified based on the meta attribute definition.

In some exemplary embodiments, step 322B and/or step 324B may be performed by a matching fields identifier, such as 220 of FIG. 2.

In some exemplary embodiments, definition of useful meta attributes may be provided in a standard configuration file. In some exemplary embodiments, the definition in the standard configuration file may be associated with predetermined trace formats. In some exemplary embodiments, the definition may be configurable to be associated with specific formats. As an example, a first field may be associated with identifying value and a user may choose a field of an entry that comprises the identifying value. In a similar manner, a second field may be associated with a timestamp and the user may choose a field of an entry that comprises the timestamp. In such a manner, a length of service operation meta attribute may be configured to be used in respect to different trace formats. The logic of the computation (e.g., subtracting the first timestamp from the second timestamp) may be unchanged.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining at least a definition of a meta attribute, the meta attribute is associated with a functional coverage model, the functional coverage model comprises attributes and corresponding values;
    obtaining a trace associated with a target system, the trace comprises a plurality of entries, wherein substantially each entry of the plurality of entries is indicative of a state of the target system;
    identifying two or more matching fields from one or more entries of the plurality of entries;
    computing, by a processor, a value of the meta attribute based upon values of the two or more matching fields and based upon the definition of the meta attribute; and
    outputting an indication of a covered coverage task, the covered coverage task comprises the value of the meta attribute associated with the meta attribute.

2. The computer-implemented method of claim 1, further comprises:
   receiving an indication of a field within entries associated with the value of the meta attribute; and
   wherein said identifying two or more matching fields comprises:
   identifying two or more matching entries; and
   identifying within each of the two or more matching entries the field as a matching field.

3. The computer-implemented method of claim 1, wherein said computing the value of the meta attribute based upon values of the two or more matching fields comprises subtracting a first value from a second value; wherein the first value is comprised by the first matching field; and wherein the second value is comprised by the second matching field.

4. The computer-implemented method of claim 1, wherein said computing the value of the meta attribute based upon values of the two or more matching fields comprises: adding one or more binary values; and wherein the one or more binary values are indicative to a property of the target system.

5. The computer-implemented method of claim 1, wherein said identifying two or more matching fields comprises:
   identifying a first matching entry comprising a first matching field, wherein the first matching entry having a first predetermined value in a first predetermined field;
   identifying a second matching entry comprising a second matching field, wherein the second matching entry having a second predetermined value in the first predetermined field; and
   wherein the first predetermined field, the first predetermined value and the second predetermined value are defined in the definition of the meta attribute.

6. The computer-implemented method of claim 5, wherein the first matching entry refers to an entity of the target system; and wherein the second matching entry refers to the entity.

7. The computer-implemented method of claim 6,
   wherein the first matching entry having an identifying value in a second predetermined field and the second matching entry having the identifying value in the second predetermined field;
   wherein the identifying value is uniquely associated with the entity; and
   wherein the second predetermined field is defined in the definition of the meta attribute.

8. The computer-implemented method of claim 5, wherein said identifying two or more matching fields further comprises: in response to said identifying the first matching entry, iterating over the plurality of entries of the trace until an iterated entity is identified as the second matching entry.

9. The computer-implemented method of claim 1, wherein the meta attribute is selected from the group consisting of:
   a duration of operation of an entity of the target system;
   a number of concurrent entities operating simultaneously in the target system; and
   a flipping of a bit in a storage unit.

10. The computer-implemented method of claim 1, further comprises determining the covered coverage task, wherein the covered coverage task further comprises values selected from the content of a portion of one or more entries associated with computation of the value of the meta attribute, wherein the values are associated with attributes.

11. The computer-implemented method of claim 10, further comprises determining a functional coverage measurement of the target system based upon values of attributes appearing in the trace and the value of the meta attribute, wherein the functional coverage measurement of the target system is in respect to the functional coverage model; and wherein the functional coverage measurement is based upon the covered coverage task.

12. The computer-implemented method of claim 1, wherein said obtaining the at least a definition of a meta attribute, said identifying, said computing the value of the meta attribute are performed a plurality of times in respect to a plurality of meta attributes.

13. The computer-implemented method of claim 1, wherein said computing the value of the meta attribute comprises:
   computing a computed value;
   associating the computed value with a binned value, wherein the binned value is a discrete value representative of a plurality of alternative values, including the computed value; and
   determining the value to be the binned value.

14. A computerized apparatus, the computerized apparatus having a processor and a storage device; the computerized apparatus comprising:
   a meta attribute obtainer operative to obtain a definition of a meta attribute, the meta attribute is associated with a functional coverage model, the functional coverage model comprises attributes and corresponding values;
   a trace obtainer operative to obtain a trace associated with a target system, the trace comprises a plurality of entries, wherein substantially each entry of the plurality of entries is indicative of a state of the target system;
   a matching fields identifier operative to identify two or more matching fields from the plurality of entries; and
   meta attribute value calculator operative to compute a value of the meta attribute based upon values of the two or more matching fields.

15. The computerized apparatus of claim 14, wherein said meta attribute value calculator is operately coupled to a value extractor, said value extractor is operative to extract values from each of the two or more matching fields identified by said matching entries identifier.

16. The computerized apparatus of claim 15, wherein said meta attribute value calculator is operative to compute the value based on the values extracted by said value calculator.

17. The computerized apparatus of claim 15, wherein said meta attribute value calculator is operative to subtract a first value of the values from a second value of the values.

18. The computerized apparatus of claim 14, wherein
   said matching fields identifier is operately coupled to an entries iterator;
   wherein in response to identification of a first matching entry by said matching entries identifier, said entries iterator is operative to iterate over the plurality of entries of the trace until an iterated entity is identified by said matching fields identifier as a second matching entry, wherein the first matching entry comprises a first matching field and the second matching entry comprises a second matching field; and
   wherein the first matching entry having a first predetermined value in a first predetermined field and the second matching entry having a second predetermined value in the first predetermined field, wherein the first predetermined field, the first predetermined value and the second predetermined value are defined in the definition of the meta attribute.

19. The computerized apparatus of claim 18, wherein said matching fields identifier is operately coupled to an entry-entity associator, wherein said entry-entity associator is configured to associate an entry with an entity of the target system based on an identifying value comprised by the entry in a second predetermined field; wherein the identifying value is uniquely associated with the entity; and wherein the second predetermined field is defined in the definition of the meta attribute.

20. The computerized apparatus of claim 14, further comprising a functional coverage determinator operative to determine a functional coverage measurement of the target system based upon values of attributes appearing in the trace and the value of the meta attribute, wherein the functional coverage measurement of the target system is in respect to the functional coverage model.

21. The computerized apparatus of claim 20, further comprising a covered task determinator operative to determine a covered coverage task, the covered coverage task comprises the value of the meta attribute associated with the meta attribute; and wherein said functional coverage determinator is operative to determine the functional coverage measurement based upon the covered coverage task.

22. The computerized apparatus of claim 14, wherein said meta attribute value calculator is operately coupled to a binning module, wherein said binning module is operative to determine the value of the meta attribute, wherein the value is a discrete value which is representative of a plurality of alternative values comprising a computed value, wherein based upon the two or more matching entries, the computed value is computed by said meta attribute value calculator.

23. A computer program product, the product comprising:
a non-transitory computer readable medium;
a first program instruction for obtaining at least a definition of a meta attribute, the meta attribute is associated with a functional coverage model, the functional coverage model comprises attributes and corresponding values;
a second program instruction for obtaining a trace associated with a target system, the trace comprises a plurality of entries, wherein substantially each entry of the plurality of entries is indicative of a state of the target system;
a third program instruction for identifying two or more matching fields from one or more entries of the plurality of entries;
a fourth program instruction for computing a value of the meta attribute based upon values of the two or more matching fields and based upon the definition of the meta attribute;
a fifth program instruction for outputting an indication of a covered coverage task, the covered coverage task comprises the value of the meta attribute associated with the meta attribute; and
wherein said first, second, third, fourth, and fifth program instructions are stored on said non-transitory computer readable medium.

\* \* \* \* \*